(12) United States Patent
Shibata

(10) Patent No.: US 10,677,176 B2
(45) Date of Patent: Jun. 9, 2020

(54) VEHICLE POWER SYSTEM

(71) Applicant: DENSO CORPORATION, Kariya, Aichi-pref. (JP)

(72) Inventor: Misao Shibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/307,424

(22) PCT Filed: May 29, 2017

(86) PCT No.: PCT/JP2017/019962
§ 371 (c)(1),
(2) Date: Dec. 5, 2018

(87) PCT Pub. No.: WO2017/212976
PCT Pub. Date: Dec. 14, 2017

(65) Prior Publication Data
US 2019/0301377 A1    Oct. 3, 2019

(30) Foreign Application Priority Data

Jun. 10, 2016    (JP) .................................. 2016-116494

(51) Int. Cl.
*F02D 29/02*    (2006.01)
*B60K 6/42*    (2007.10)
(Continued)

(52) U.S. Cl.
CPC ................ *F02D 29/02* (2013.01); *B60K 6/42* (2013.01); *B60W 10/26* (2013.01); *F02D 17/00* (2013.01);
(Continued)

(58) Field of Classification Search
USPC .............................................. 322/17; 701/22
See application file for complete search history.

(56) References Cited

U.S. PATENT DOCUMENTS 6,426,608 B2 *  7/2002  Amano .................. B60K 6/485
                                              320/163
6,647,326 B2 * 11/2003  Nakamori .............. B60K 6/365
                                              477/158
(Continued)

FOREIGN PATENT DOCUMENTS

JP    H10-243501 A    9/1998
JP    2000-270401 A   9/2000
(Continued)

OTHER PUBLICATIONS

Jul. 11, 2017 International Search Report issued in International Patent Application No. PCT/JP2017/019962.

*Primary Examiner* — Pedro J Cuevas
(74) *Attorney, Agent, or Firm* — Oliff PLC

(57) ABSTRACT

A vehicle system for mounting in a vehicle which includes a control device. The control device includes a calculation unit calculating a stopping rate which is a percentage an automatic stop in a predetermined period, and a charge controller. The charge controller performs charging relative to an electrical storage device from a power generator when a charging rate is lower than a predetermined charging rate. The charge controller also controls the power generator such that the charging rate to the electrical storage device is increased with an automatic restart.

20 Claims, 4 Drawing Sheets

Figure 1:
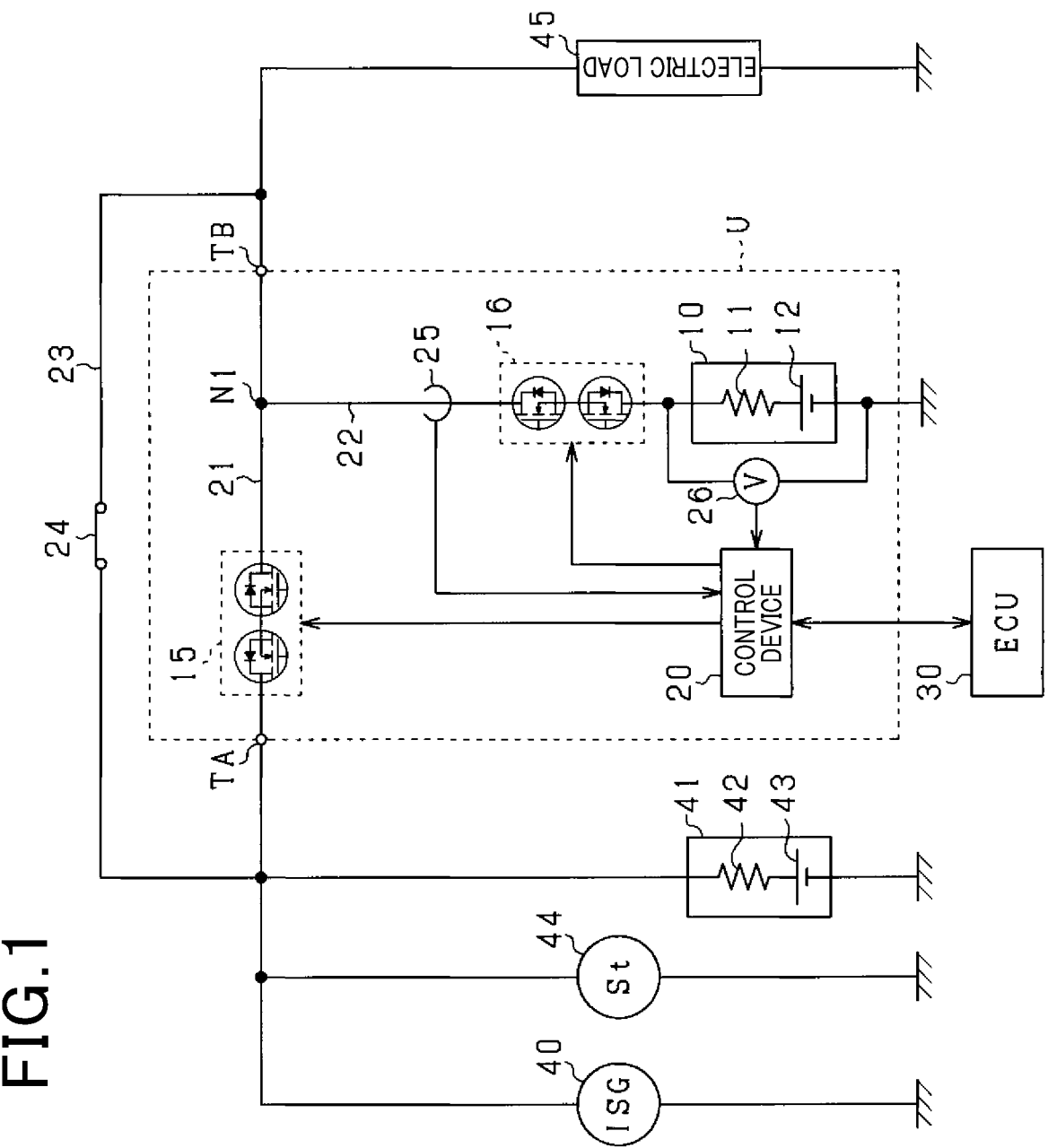

(51) Int. Cl.
*B60W 10/26* (2006.01)
*F02D 29/06* (2006.01)
*F02N 11/08* (2006.01)
*F02D 17/00* (2006.01)
*H02J 7/16* (2006.01)
*H02J 7/14* (2006.01)

(52) U.S. Cl.
CPC .............. *F02D 29/06* (2013.01); *F02N 11/08* (2013.01); *H02J 7/14* (2013.01); *H02J 7/16* (2013.01); *Y02T 10/7011* (2013.01)

(56) References Cited

U.S. PATENT DOCUMENTS

| | | | | |
|---|---|---|---|---|
| 6,817,964 | B2* | 11/2004 | Kayukawa | B60K 6/365 477/15 |
| 6,986,331 | B2* | 1/2006 | Mizutani | F02D 41/065 123/179.15 |
| 7,859,224 | B2* | 12/2010 | Baer | H02J 7/342 320/128 |
| 7,958,868 | B2* | 6/2011 | Sugai | F02P 5/1506 123/406.11 |
| 8,290,652 | B2* | 10/2012 | Niimi | B60K 6/445 701/22 |
| 8,356,472 | B2* | 1/2013 | Hiranuma | F01N 13/009 60/286 |
| 8,700,243 | B2* | 4/2014 | Kamijo | F02N 11/0844 701/22 |
| 8,924,060 | B2* | 12/2014 | Yamamoto | B60W 50/082 701/22 |
| 9,020,673 | B2* | 4/2015 | Yamamoto | B60K 6/445 701/22 |
| 9,067,500 | B2* | 6/2015 | Penev | F03D 9/32 |
| 9,090,256 | B2* | 7/2015 | Takahashi | B60W 10/184 |
| 9,165,736 | B2* | 10/2015 | Nakamoto | G01R 31/382 |
| 9,221,457 | B2* | 12/2015 | Nakano | B60K 6/46 |
| 9,346,458 | B2* | 5/2016 | Ohkuma | B60K 6/445 |
| 9,425,647 | B2* | 8/2016 | Nomoto | H02J 7/1446 |
| 9,463,699 | B2* | 10/2016 | Nakamoto | H01M 10/0525 |
| 9,550,432 | B2* | 1/2017 | Hisano | B60L 11/1861 |
| 9,701,207 | B2* | 7/2017 | Nakamoto | H01M 10/0525 |
| 10,106,143 | B2* | 10/2018 | Ogawa | B60L 58/12 |
| 10,336,196 | B2* | 7/2019 | Nakamoto | B60L 50/10 |
| 10,525,834 | B2* | 1/2020 | Sakakibara | B60L 11/1861 |
| 2001/0052760 | A1* | 12/2001 | Amano | B60K 6/485 320/163 |
| 2003/0109970 | A1* | 6/2003 | Nakamori | B60K 6/365 701/22 |
| 2006/0267552 | A1* | 11/2006 | Baer | H02J 7/342 320/128 |
| 2010/0070122 | A1* | 3/2010 | Niimi | B60K 6/445 701/22 |
| 2010/0228461 | A1* | 9/2010 | Sugai | B60W 10/06 701/101 |
| 2010/0268438 | A1* | 10/2010 | Hiranuma | F01N 13/009 701/102 |
| 2013/0024063 | A1* | 1/2013 | Yamamoto | B60W 10/08 701/22 |
| 2013/0066494 | A1* | 3/2013 | Kamijo | F02N 11/0844 701/22 |
| 2013/0073136 | A1* | 3/2013 | Yamamoto | B60K 6/445 701/22 |
| 2013/0151056 | A1* | 6/2013 | Nakano | B60K 6/46 701/22 |
| 2013/0314052 | A1* | 11/2013 | Nomoto | H02J 7/1446 320/155 |
| 2014/0011630 | A1* | 1/2014 | Takahashi | B60W 10/184 477/4 |
| 2014/0074333 | A1* | 3/2014 | Ohkuma | B60K 6/445 701/22 |
| 2014/0076641 | A1* | 3/2014 | Penev | F03D 9/32 180/2.2 |
| 2014/0104739 | A1* | 4/2014 | Nakamoto | H02J 7/0021 361/160 |
| 2014/0236406 | A1* | 8/2014 | Ishida | B60W 10/02 701/22 |
| 2014/0244091 | A1* | 8/2014 | Eto | B60W 20/40 701/22 |
| 2014/0257607 | A1* | 9/2014 | Van Maanen | B60W 20/40 701/22 |
| 2015/0006007 | A1* | 1/2015 | Kitahata | B60K 6/442 701/22 |
| 2015/0298570 | A1* | 10/2015 | Hisano | B60L 11/1861 701/22 |
| 2015/0336459 | A1* | 11/2015 | Nakamoto | H02J 7/0016 307/10.1 |
| 2016/0152224 | A1* | 6/2016 | Tabata | B60W 10/115 701/22 |
| 2016/0355098 | A1* | 12/2016 | Sakakibara | B60L 58/12 |
| 2017/0001525 | A1* | 1/2017 | Nakamoto | B60L 50/10 |
| 2017/0021820 | A1* | 1/2017 | Ogawa | B60L 58/12 |
| 2017/0253128 | A1* | 9/2017 | Nakamoto | B60L 50/10 |
| 2018/0056974 | A1* | 3/2018 | Meyer | B60W 10/026 |
| 2019/0092185 | A1* | 3/2019 | Ogawa | G01C 21/3658 |
| 2019/0218984 | A1* | 7/2019 | Anzawa | B60K 6/445 |
| 2019/0232789 | A1* | 8/2019 | Kinoshita | B60T 8/172 |
| 2019/0241174 | A1* | 8/2019 | Ito | B60W 20/12 |
| 2019/0283614 | A1* | 9/2019 | Nakamoto | H02J 7/0021 |

FOREIGN PATENT DOCUMENTS

| | | |
|---|---|---|
| JP | 2005-291158 A | 10/2005 |
| JP | 3880924 B2 | 2/2007 |
| JP | 2007-270810 A | 10/2007 |
| JP | 2010-202119 A | 9/2010 |
| JP | 2010-252414 A | 11/2010 |
| JP | 2010-269712 A | 12/2010 |
| JP | 2011-163281 A | 8/2011 |
| JP | 2013-167219 A | 8/2013 |
| JP | 2014-040223 A | 3/2014 |
| JP | 2015-149849 A | 8/2015 |
| JP | 2015-214226 A | 12/2015 |
| JP | 2016-028198 A | 2/2016 |

* cited by examiner

VEHICLE POWER SYSTEM

CROSS REFERENCE APPLICATION

This application is a U.S. National Phase Application under 35 U.S.C. 371 of the International Application PCT/JP2017/019962 filed on May 29, 2017 and published in Japanese as WO2017/212976 on Dec. 14, 2017. This application is based on and claim the benefit of priority from Japanese Application No. 2016-116494 filed on Jun. 10, 2016. The entire disclosure of the above application are incorporated herein by reference.

BACKGROUND

A vehicle power system mounted in a vehicle.

TECHNICAL FIELD

During an automatic stop of an engine due to idling stop control, a power supply supplied by a power generator generating electricity by rotation of the engine shaft is terminated, and a power supply to electric loads are performed by only an electrical storage device such as a lead battery. If the frequency of the automatic stop (stopping rate) by the idling stop control is high, an amount of the power supplied to the electric load from the electrical storage device in turn is also high, and a charging rate of the electrical storage device is also low, compared to when the stopping rate of is low.

Additionally, in a case where the charging rate of the electrical storage device is low when the vehicle is stopped, since the electrical storage device is charged or power is supplied to the electric load instead of the electrical storage device, power generation is performed at the power generator when the engine is started. When the vehicle is stopped, the engine is thus started to generate power, and once consumption of fuel in the engine is performed, a reduced fuel consumption effect is decreased due to idling stop control.

The patent literature 1 discloses a configuration such that, when a stopping rate is high, an upper limit of the charging rate to an electrical storage device is set to be high.

CITATIONS

Patent Literature

Patent Literature 1 U.S. Pat. No. 3,880,924

The patent literature 1 provides a configuration of an electrical storage device which is charged by regenerative power generated during a brake control of the vehicle. For example, when the vehicle is travelling in city road areas, regenerated power of the generator is low as a result of a low vehicle speed, and there is a concern of an automatic stop frequently occurring due to idling stop control. In this situation, even if the configuration disclosed in the PTL 1 is adopted, once the fuel consumption in the engine is performed to generate power when the vehicle is stopped, there is a concern of decrease in a reduced fuel consumption effect due to idling stop control.

In view of the issues described, an object of the present disclosure is to provide a system in which fuel consumption of an engine is performed to generate power when a vehicle stops, whereby a decrease in a reduced fuel consumption caused by idling stop control is suppressed.

SUMMARY

A first configuration is a vehicle power system mounted in a vehicle.
The vehicle power system includes,
  a power generator that generates power by rotation of an output shaft of an engine;
  an electrical storage device connected to the generator; and
  a control device that automatically stops the engine when a predetermined automatic stop condition is met, and automatically restarts the engine by operation of a starting device, when a predetermined restart condition is met, after the automatic stop of the engine.
The control device includes a calculation unit that calculates a stopping rate which is a rate at which the automatic stop is executed in a predetermined period, and a charge controller which performs charging, relative to charging of the electrical storage device from the power generator, when a charging rate of the electrical storage device is less than a predetermined charging rate.

The charge controller also controls the power generator to increase the charging rate of the electrical storage device at the automatic restart of the engine, when a condition that the calculation of the stopping rate exceeds a first threshold is met.

According to the configuration, over discharge of the electrical storage device can be suppressed by performing charging relative to the electrical storage device from the power generator, when the charging rate of the electrical storage device is less than the predetermined charging rate. However at this point, when the frequency of the automatic stop due to the idling stop control is high, there is an increased opportunity of the charging rate of the electrical storage device that is less than the predetermined charging rate, by power consumption of electric load, when the automatic stop is performed. As a result, when the stopping rate is high, the engine is restarted to perform charging of the electrical storage device from the power generator, and in such a case there is concern of an increase frequency of regeneration of power performed by the power generator due to fuel consumption. Furthermore a duration of the automatic stop period is reduced, and fuel consumption deteriorates due to fuel consumption used for power generation.

According to the configuration, the control of the power generator is performed to increase the charging rate of the electrical storage device at the time of the automatic restart, when the stopping rate exceeds the first threshold. That is, charging relative to the electrical storage device from the power generator is initiated. For this reason, when the stopping rate is higher than the first threshold, the charging rate of the electrical storage device is increased. As a result, an amount of consumed fuel due to the electric load when the engine is stopped may be easily secured in the electrical storage device.

Furthermore, the decrease in the charging rate of the electrical storage device during the automatic stop of the vehicle is suppressed. Since forcible driving of the engine for charging only is suppressed, the deterioration of the reduced fuel consumption due to operation of the engine during the automatic stop of the vehicle may also be suppressed It is noted that combustion of the engine is performed and power is generated by the power generator using an output of the engine. In this case, an energy efficiency is higher at a time of travelling, compared to an energy efficiency when the engine is started, at a stopping time of the vehicle and the power is generated using the power generator. Additionally, at the automatic restart, charging relative to charging from the power generator to the electrical storage device may be superimposed by charging regenerative power that is generated at the power generator to the electrical storage device.

A second configuration is the charge controller that increases the charging rate of the electrical storage device when controlling the power generator, when the stopping rate calculated by the calculation unit exceed the first threshold. In this case the charge controller terminates charging which is relative to the electrical storage device from the power generator, when the calculated stopping rate, calculated by the calculation unit is lower than a second threshold. In this case the second threshold is lower than the first threshold.

In general, at a time of brake control of the vehicle, the generation of regenerative power at the generator is performed and power obtained from the regenerative power is charged to the electrical storage device. If, however, the power generation is continuously performed when the vehicle is travelling, the power obtained from the regenerative power is not chargeable to the electrical storage device, as a result of the charging rate of the electrical storage device which draws near to an upper limit value. Hence the power efficiency generally deteriorating is a concern. In this view, the charge controller is configured such that, the power generation is performed when the vehicle is travelling, if the stopping rate exceeds the first threshold. Then if the stopping rate is lower than the second threshold, the charge controller is configured to stop power generation when the vehicle is travelling. As a result, power from the regenerative power is chargeable to the electrical storage device.

In a third configuration the charge controller determines whether the calculated stopping rate calculated by the calculation unit has exceeded the first threshold, when the automatic restart is performed. In accordance with a determined result, if the calculated stopping rate, calculated by the calculation unit exceeds the first threshold, the charge controller controls the power generator to increase the charging rate of the electrical storage device at the automatic restart.

The stopping rate increases when the automatic stop of the engine is performed. Thereafter, the stopping rate decreases by performing the restart of the engine. That is, the stopping rate is maximum at a time of the automatic restart. Since the charge controller determines whether the stopping rate exceeds the first threshold in the configuration described above at the time of the automatic restart, the number of times of determining whether the stopping rate exceeds the first threshold may be reduced, hence simplification of a process achievable.

Furthermore, according to configuration described above, when the stopping rate exceeds the first threshold at the time of the automatic restart, the control of the power generator is performed to increase the charging rate of the electrical storage device, with the automatic restart. As a result, since the charging rate of the electrical storage device is increased immediately after the stopping rate exceeds the first threshold, the decrease in the charging rate of the electrical storage device during the automatic stop of the engine is reliably suppressed.

In a fourth configuration, the charge controller sets the predetermined charging, when the vehicle is travelling, to be higher than a the predetermined charging rate when the vehicle is stopped, and the higher the stopping rate, the higher the predetermined charging rate is set when the vehicle is travelling.

In this way, a predetermined charging rate when the vehicle is travelling is set to be higher than a predetermined charging rate when the vehicle is stopped, thus an amount of consumed power when the vehicle stops is secured in the electrical storage device. As a result, the charging rate of the electrical storage device is decreased during the automatic stop of the engine, and deterioration of reduced fuel consumption by the operation of the engine when the vehicle is stopped can be suppressed.

Here, a higher stopping rate refers to when the stopping time duration of the vehicle is long, relative to the travelling time duration of the vehicle, and the amount of the consumed power of the electric load increases during the stopping time of the vehicle. If a high predetermined charging rate is set with the high stopping rate, the deterioration of the reduced fuel consumption due to engine operation when the vehicle is stopped is suppressed.

In a fifth configuration, when the vehicle is travelling, the charge controller sets the predetermined charging rate to be higher than the predetermined charging rate when the vehicle is stopped. The charge controller sets the predetermined charging rate when the vehicle is travelling, on the basis of multiplying a total amount of the consumed power of a total electric load of the power supplied from the electrical storage device by a length of time period in which the automatic stop is continuously performed.

The total amount of consumed power of the electric load when the vehicle is stopped is equivalent to multiplying the total amount of the consumed power of the total electric load by the length of the time in which the automatic stop is continuously performed. By setting the predetermined charging rate based on multiplying the total amount of the consumed power of the total electric load by the length of the time in which the automatic stop is continuously performed, a situation of the electrical storage device being in an excess discharge state may be suppressed.

In a sixth configuration, when the stopping rate calculated by the calculation unit exceeds the first threshold, the power generator is controlled to increase the charging rate of the electrical storage device with the automatic restart. If the charging rate of the electrical storage device is less than the predetermined charging rate, then the charge controller controls the power generator such that an output voltage of the power generator is higher than when charging relative to the electrical storage device from the power generator is performed.

The higher the stopping rate, the longer the stopping time of the vehicle becomes relative to travelling time period of the vehicle, and there is an increased amount of the power consumption of the electric load, during stopping time period of the vehicle. When the stopping rate exceeds the first threshold, the charge controller is configured to perform charging relative to the electrical storage device. In this case, the charge controller sets the output voltage of the power generator to be higher than when charging is performed with a decrease in SOC (state of charge). As a result, an amount of the charged power stored in the electrical storage device is increased when the stopping rate is high. For this reason, the amount of consumed power by the electric load can be secured in the electrical storage device, during the automatic stop of the engine. Furthermore, the decrease in the charging rate of the electrical storage device during the automatic stop of the engine can be suppressed, and the deterioration of reduced fuel consumption due to the operation of the engine during the stopping of the vehicle may also be suppressed.

In a seventh configuration, the calculation unit calculates, as the stopping rate, a percentage of time in which the vehicle is stopped in the predetermined period. When the engine is restarted to generate power with the decrease of SOC, a time period in which the automatic stop of the engine in enabled, and a time period in which the engine actually automatically stops are different time values. Here, the time period of when the automatic stop of the engine is enabled and the time period of when the vehicle is stopped are almost the same. By calculating the stopping rate of the vehicle, based on the time period of when the vehicle is stopped, the stopping rate of the engine can be calculated in accordance with the time period in which the automatic stop of the engine is enabled.

An eighth configuration is the calculation unit, calculating the percentage of time in which the automatic stop is performed in the predetermined period. According to the configuration, a stopping rate which reflects an actual idling stop frequency may be calculated by calculation of the percentage of time in which the automatic stop of the engine is performed in the predetermined period.

In a ninth configuration, the calculation unit sets the predetermined period based on a travelling distance of the vehicle. A predetermined period may also be set based on the travelling distance of the vehicle.

In a tenth configuration, the calculation unit acquires information from a navigation system related to a future travelling state of a vehicle, and calculates the stopping rate based on the information. The future travelling state of the vehicle is predicted and a future stopping rate of the vehicle can be calculated. Appropriate charging may thus be performed in accordance with changes of the vehicle state. For example, the stopping rate can be decreased when the vehicle is travelling at high speed on the highway. The stopping rate may be decreased when there is a high possibly of vehicle congestion.

In an eleventh configuration, the electrical storage device includes a first secondary battery (10) and a second secondary battery (41). The respective first secondary battery and second secondary battery are connected to each other via a switching element (15). The charge controller performs charging of the first secondary battery and the second secondary battery when control of the power generator is performed to increase the charging rate of the electrical storage device at the automatic restart. In this case, if the stopping rate, calculated by the calculation unit, exceeds the first threshold, charging is performed by switching the switching element to an electrical conduction state.

A system that includes the first secondary battery and the second secondary battery is configured to perform charging for both the first secondary battery and the second secondary battery, when the power generation is performed by the power generator during the travelling of the vehicle, if the stopping rate exceeds the first threshold. In this configuration, the amount of power charged to the total electrical storage device may be increased, and when the engine is automatically stopped, the amount of the power equal to the power consumption of the electric load is easily secured in the electrical storage device. As result, when the vehicle stops, generation of power performed by the power generator with consumption of fuel of the engine may be suppressed.

In a twelfth configuration, the electrical storage device includes the first secondary battery (10) and the second secondary battery (41). The first secondary battery and the second secondary battery are connected to each other via switching elements (15). The control of the power generator is performed to increase the charging rate of the electrical storage device at the automatic re-start of the engine, relative to a battery which has a lower charging rate than the predetermined charged rate among the first secondary battery and the second secondary battery. The charge controller performs charging relative to the battery which has a lower charging rate than the predetermined charging rate, by having the switching element provided in the electric conduction state.

According to the configuration described hereinabove, increasing the charging rate of the secondary battery is rapidly performed, than a configuration of charging the secondary battery using only the generator, hence deterioration of the secondary battery is reliably suppressed.

A BRIEF DESCRIPTION OF DRAWINGS

Figure 2:
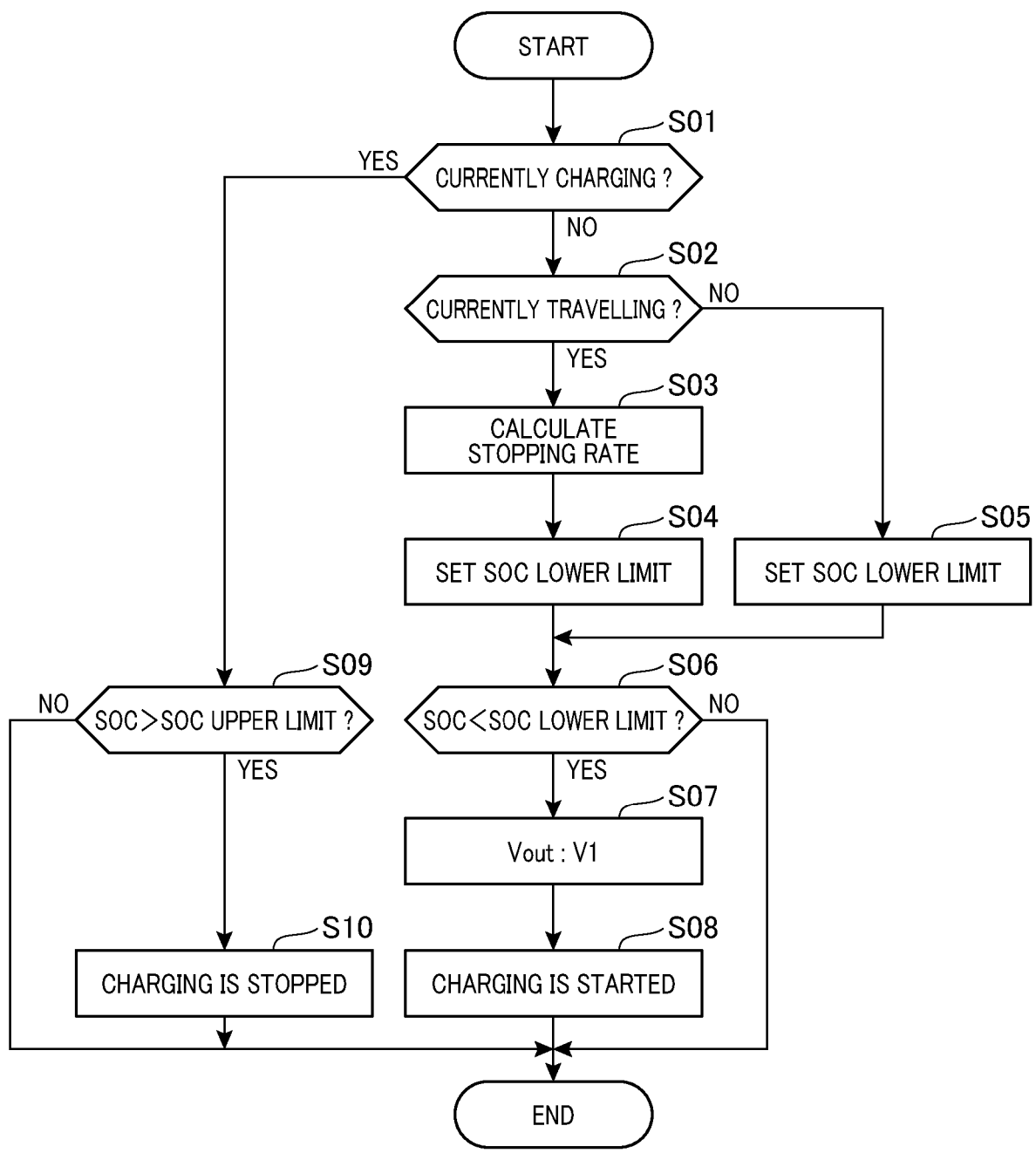
Figure 3:
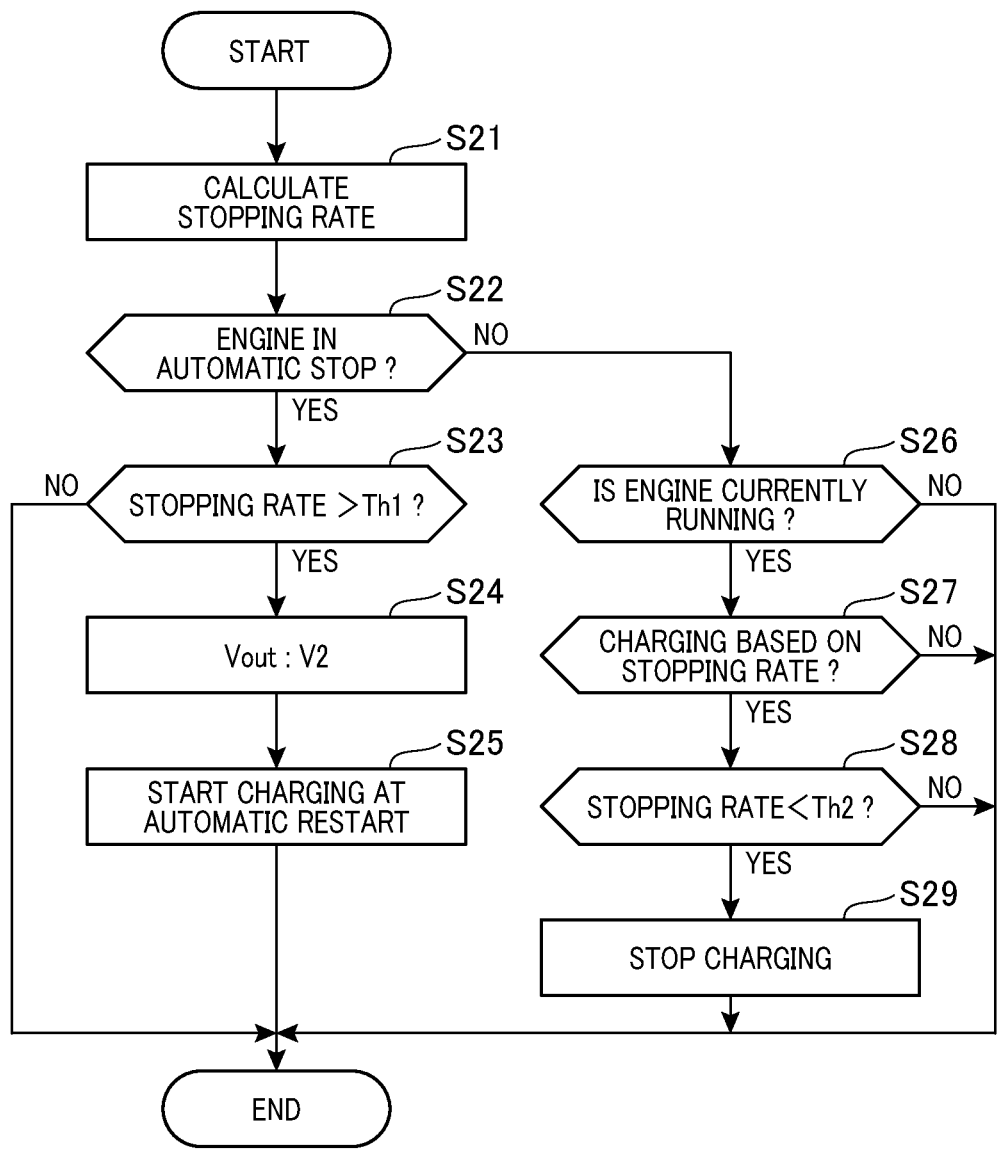
Figure 4:
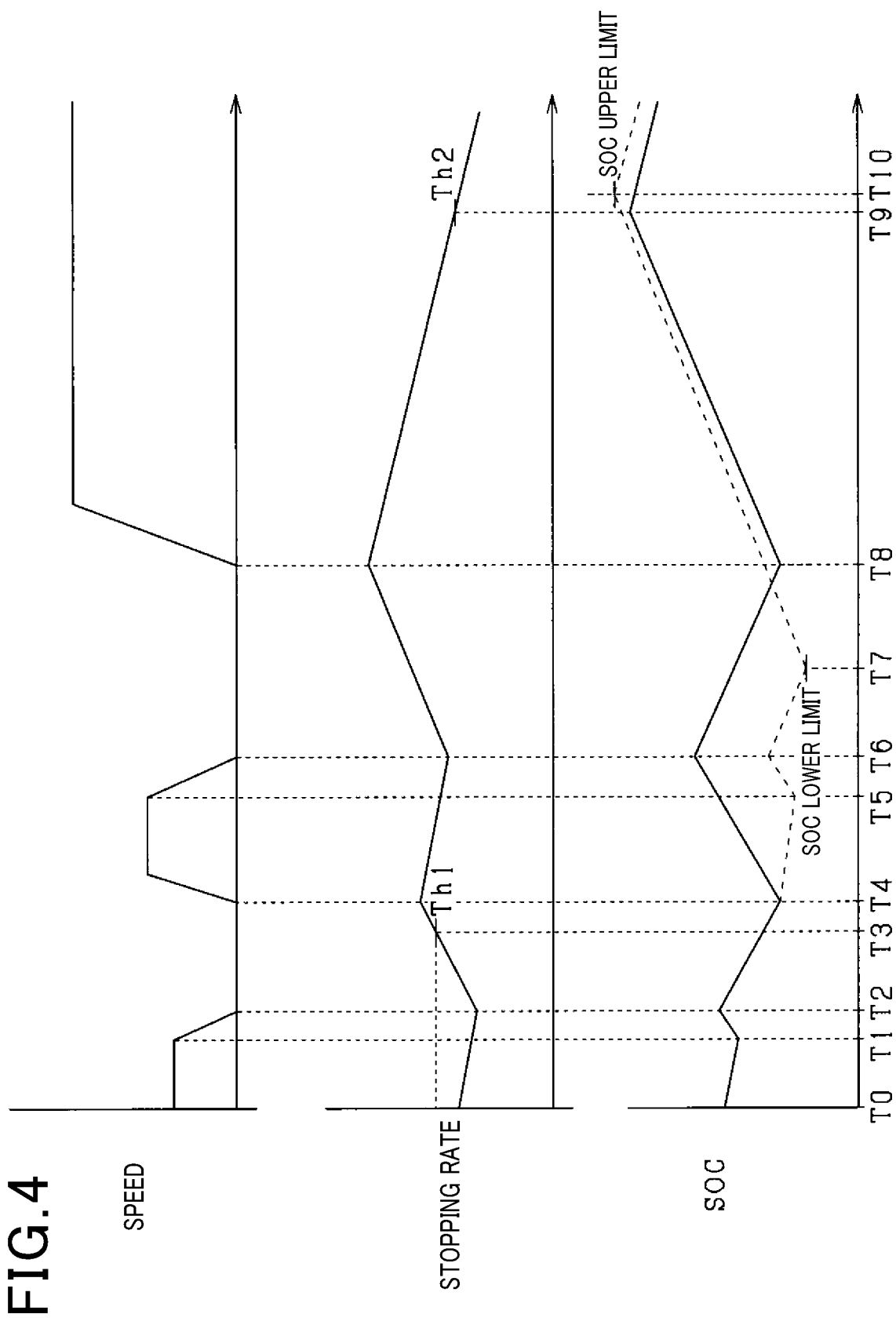

In the accompanying drawings;
FIG. 1 is an electrical configuration of a power system;
FIG. 2 is a flowchart showing a charging process based on a state of charge (SOC);
FIG. 3 is a flowchart showing a charging process based on a stopping rate; and
FIG. 4 is a time chart showing a change in the SOC when the charging process is performed based on the stopping rate.

EMBODIMENTS

Hereafter, embodiments of the present disclosure will be described based on figures. A power system of the present embodiment may be mounted in a vehicle which travels using an engine (internal combustion engine) as an driving switch, that is, an engine having an idling stop function.

As shown in FIG. 1, the power system includes a lithium-ion battery 10 (a first secondary battery), a MOS switch 15 (switching element), a switch mode rectifier (SMR) switch 16, an electric rotor 40 (power generator, starting apparatus), lead battery 41 (the second secondary battery), starter 44 (starter device) and each type of electric load 45. Among the above-mentioned parts, the lithium-ion battery 10 and each of the switches 15 and 16 are accommodated in a case (accommodating case), not shown in the diagrams, and unified into one part configuring a battery unit U. Additionally, the battery unit U includes a control device 20 controlling the vehicle power system, and each of the switches 15 and 16, and the control device 20 are mounted on the same plate and accommodated inside the case.

The battery unit U is equipped with a first terminal TA as an external terminal and a second terminal TB. The electric rotor 40, the lead battery 41 and the starter 44 are connected to the first terminal TA, and the electric load 45 is connected to the second terminal TB. It is noted that the either one of the terminals TA and TB is a large current input and output terminal for an input and output of a flowing current of the electric rotor.

A rotating shaft of the electric rotor 40 is drive coupled relative to an engine output shaft, by the belt, for example. The engine output shaft is omitted from the Figs. The engine output shaft rotates due to the rotating shaft of the electric rotor 40, in contrast to the rotating shaft of the electric rotor 40 which rotates by rotation of the engine output shaft. In this instance, the electric rotor 40 includes a power generator function that generates power by the rotation of the engine output shaft and the power generated by rotation of the engine output shaft and a vehicle shaft (regenerated power generation), and configures an Integrated Starter Generator.

The lead battery 41 and the lithium-ion battery 10 are electrically connected in parallel relative to the electric rotor

40. The batteries 10 and 41 are chargeable by power generation of electrical power of the electric rotor 40. The electric rotor 40 is driven by power supply from each of the batteries 10 and 41.

The lead battery 41 is a known universal battery. The lithium-ion battery 10 has a small power loss when charging, and is a high density battery with a high output density and high energy density, compared to the lead battery.

The lead battery 41 is configured specifically with anode material of lead dioxide (PbO2), a cathode material lead (Pb) and electrolyte solution of sulfuric acid ($H_2SO4$). A plurality of battery cells configured from these electrodes are connected in series. It is noted that a charging capacity of the lead battery 41 is set to be larger than a charging capacity of the lithium-ion battery 10 in the present embodiment.

In contrast, an oxide containing lithium (lithium metal complex oxide substance) is used as the anode material of the lithium-ion battery 10. Specifically, a LiCoO2 (lithium cobalt oxide) LiMn2O4 (lithium manganese oxide), $LiNiO_2$ (lithium nickel oxide) and $LiFePO_4$ (lithium iron phosphate), for example can be used. A metal alloy containing carbon (C), or graphite, lithium titanate (for example, Lix-$TiO_2$), and Si or Sn may be used as the cathode material of the lithium ion battery 10. An organic electrolyte solution is used in the electrolyte solution of the lithium-ion battery 10. Additionally, the plurality of battery cells configured from these electrodes are serially connected.

Note that symbols 12 and 43 in FIG. 1 represent a cluster of battery cells of the lithium-on battery 10 and the lead battery 41, and the symbols 11 and 42 represent an internal resistance of the respective lithium-on battery 10 and the lead battery 41.

In the electric load 45, voltage of the power supply is generally constant, or a voltage is stable, and changes in at least a predetermined range, that is, for constant voltage requirement loads. A navigation apparatus and audio apparatus are specific examples of the constant voltage required loads. In this case, by suppression of change in voltage, stable operation of the above mentioned apparatuses can be achieved. Even in a case when a voltage that is input to the stable voltage requirement load changes, the stable voltage requirement load is restarted after operation of the stable voltage requirement load stops. It is noted that the electric load 45 includes an ECU described in detail hereinafter.

The electric load 45 also includes headlights, a wiper such as a front wind shield, an air fan of an air conditioning apparatus, and heater for defrosting a rear wind shield, for example. If the voltage of the power supply changes for the headlight, wipers or the wind fans, for example, blinking of the headlights, a change in the operating speed of the wipers and a change in a rotation speed of the wind fan (change in a wind sound) occurs, therefore a constant voltage of a power supply is required.

In the battery unit U, connecting paths 21 and 22 are provided as a unit internal electrical path which connects each of the terminals TA, TB and the lithium-ion battery 10 to each other. Also, the MOS switch 15 is provided as an open/close switching means on the first connecting path 21 which connects the first terminal TA and the second terminal TB. The SMR switch 16 is provided on the second connecting path 22 which connects a connection point N1 (battery connection point) on the first connecting path 21 and the lithium-ion battery 10. Each of the switches 15 and 16 include a 2×n MOSFETs (semiconductor switches). Parasitic diodes of the two pairs of MOSFETs are serially connected in an opposed direction from each other. When each switch 15 and 16 is an off state, a current flowing on the path of the switches is completely shut off by the parasitic diode.

In this power system, a bypass route 23 which allows connection of the lead battery 41 and the electric load 45 without passing through the MOS switch 15 is provided. Specifically, the bypass route 23 is provided to bypass the battery unit U, and to electrically connect an electrical path (that is a path connecting to the lead battery 41) which is connected to the first terminal TA, and another electrical path (a path connecting to the electric load 45) connected to the second terminal TB. A bypass switch 24 which provides either a shutoff state or electrical conduction state between a side of the lead battery 41 and a side of the electric load 45 is configured on the bypass path 23. The bypass switch 24 is a continually closed-type relay switch. It is noted that the bypass path 23 and the bypass switch 24 may be provided to bypass the MOS switch 15 in the battery unit U.

The control device 20 performs switching of ON (closed) and OFF (open) switching of switches 15 and 16.

In this case, the control device 20 controls the ON/OFF states of the MOS switch 15 according to whether a time point is a discharge time point (load driving time point) where the power supply is performed relative to the electric load; a time point is a charging time point of charging by the power supply from the electric rotor 40; or whether a time point is the restart time point in which the engine is restarted by the electric rotor 40 in the stopped state of the engine of an idling stop control. It is noted that the SMR switch 16 is basically kept ON (closed) state when the vehicle is travelling, and placed OFF (open) when abnormality occurs in the battery unit U or the electric rotor 40.

An ECU 30 outside the battery unit is connected to the control device 20. That is, these control device 20 and ECU 30 are connected to each other via a communication network, such as CAN. Each type of data recorded in the control device 20 and ECU 30 is shared data between the control device 20 and the ECU 30.

The ECU 30 is an electronic control unit which has a function of performing idling stop control. The idling stop control includes automatic stop of the engine when a known predetermined automatic stop condition is met, and automatic re-start of the engine when a predetermined restarting condition is met in the automatic stop state.

The electric rotor 40 generates power from rotational energy of the engine output shaft. Specifically, once a rotor of the electric rotor 40 is rotated by the engine output shaft, an alternating current is initiated in a stator coil according to an excitation current flowing in a rotor coil, and the alternating current is changed to direct current by a rectifier. The excitation current which flows in the rotor coil of the electric rotor 40 is then adjusted by a regulator, and a voltage of the power generated direct current is adjusted to a predetermined adjusted voltage Vreg.

The power generated at the electric rotor 40 is supplied to the electric load 45, in addition to the lead battery 41 and the lithium-ion battery 10. When driving of the engine is stopped and power is not generated at the electric rotor 40, the power is supplied to the electric load 45 from the lead battery 41 and lithium battery 10. A discharged quantity from the lead battery 41 and the lithium-ion battery 10 to the electric load 45, and a charged amount from the electric rotor 40 is appropriately adjusted so that SOC (a charging rate; that is an actual charged amount relative to a fully charged capacity) is not is a range of an excess discharge (SOC user area).

In this case, the control device 20 restricts a charging amount to the lithium-ion battery 10, and executes a protection control to protect against excess discharge from the lithium-ion battery, using a SOC of the lithium-ion battery 10 in the user area. Specifically, the control device 20 continually acquires a detected value of charged and discharged current I of the lithium-ion battery (10) from the current sensor 25 (current detector), and continually acquires a detected value of voltage V between terminals of the lithium-ion battery from a voltage sensor 26 (voltage detector). The control device 20 also performs the protection control based on the voltage V between the terminals and the detected value of the charged and the discharged current I.

The control device 20 controls to protect against excess discharge of the lithium-ion battery 10, by charging from the electric rotor 40 when the voltage V between terminals of the lithium-ion battery has dropped to a voltage which is than a lower limit. The lower limit voltage may be set based on a voltage corresponding to a lower limit value of the SOC usage region. Additionally, the control device 20 performs excess voltage protection such that the voltage V between the terminals of the lithium-ion battery 10 is not increased to a higher voltage than an upper limit voltage, by controlling variation of the adjusted voltage Vreg. The upper limit voltage may be set based on a voltage which corresponds to an upper limit value of the SOC useable region.

The control device 20 acquires a detected value from the voltage sensor which detects a voltage Vp between the terminals of the lead battery 41, and performs the same protection control of the lithium-ion battery 10, relative to the lead battery 41. It is noted that a configuration of a control device other than the control device 20 (for example the ECU 30) performing the protection control of the lead battery 41 may be provided.

Also in the present embodiment, the electric rotor 40 generates power by regenerative energy of the vehicle, performs charging of both the batteries 10 and 41, and performs low speed regeneration. This low speed regeneration is performed when conditions of the vehicle travelling in a low speed state and fuel injection to the engine is cut are met, for example.

When the engine is automatically stopped by the idling stop control, the power supply of the electric rotor 40 is stopped, and the power supply is performed to the electric load 45 by only the batteries 10 and 41. If a frequency (stopping rate) of the automatic stop due to idling stop control is high, the quantity of power supplied to the electric load 45 from the batteries 10 and 41 is large, and the SOC of the batteries 10 and 41 is decreased, compared to when the stopping rate is low. When the SOC of the batteries 10 and 41 is decreased, there is a concern of the automatic restart of the idling stop control not being executed.

If the SOC of the electrical storage device decreases when the vehicle is stopped, the engine starts and the power generation of the electric rotor 40 is performed to charge both batteries 10 and 41, or to supply power to the electric load 45, instead of both the batteries 10 and 41. When the vehicle is stopped, once the engine is started for power generation, an effect of reduced fuel consumption decreases due to the idling stop control.

In this view, in the embodiment, as [the calculation unit] the control device 20 calculates the stopping rate, which is a percentage in which the automatic stop executed in a predetermined time. Additionally, as the [the charge controller], the control device 20 according to the present embodiment is set to perform control of the electric rotor 40, such that the SOC of the batteries 10 and 41 is increased with the automatic restart of the engine, when a condition of the stopping rate exceeding a first threshold Th1 is met. Specifically, charging of the lithium-ion battery 45 and the lead battery 10 is initiated from the generator immediately after the automatic restart when the vehicle is travelling. It is noted that a control device other than the control device 20 (for example the ECU 30) may be equipped with the function of [the calculation unit] and a function of a [the charge controller].

FIG. 2 shows a flowchart of a process related to a power generation control based on the SOC of the present embodiment. This process is performed by the control device 20 at every predetermined cycle.

At step S01, the control device 20 determines whether charging of the lithium-ion battery 10 and the lead battery 41 is now being performed. If charging of the respective lithium-ion battery 10 and the lead battery 41 is not performed (NO at S01), at step S02, it is determined whether the vehicle is travelling.

If the vehicle is travelling (YES at S02), at S03 the stopping rate which is a percentage of the automatic stop in a predetermined period is calculated. Specifically, the predetermined period is a period between a present time point to a time point before the predetermined period. In this predetermined period, the percentage of time in which the vehicle is stopped is calculated as the stopping rate. At step S04, the lower limit of the SOC (predetermined charging rate) is set for each of the batteries 10 and 41. Specifically, the higher the stopping rate, the higher the lower limit of SOC is set. The SOC lower limit when the vehicle is travelling is set to be higher than the SOC lower limit when the vehicle is stopped.

If the vehicle is stopped (NO at S02), at step S05, the lower limit of SOC is set for each of the lithium-ion battery 10 and the lead battery 41. Specifically, the SOC lower limit is set to a value so that the restart of the engine is can be performed by the electric rotor 40 (or the starter 44), from power supplied to the electric rotor 40 from the batteries 10 and 41.

At step S06, it the control device determines whether the present SOC is lower than the SOC lower limit for at least one of the batteries 10 and 41. If the present SOC is lower than the SOC lower limit for at least one of the batteries 10 and 41, (YES at S06), at S07 a commanded value of output voltage of the electric rotor 40 is set to a predetermined voltage value V1. At step S08, charging of the present SOC to a value lower than the lower limit is initiated, among the batteries 10 and 41. If the present SOC is equal to or higher than the SOC lower limit (NO at S06), for both batteries, the process ends.

When performing charging of the lithium-ion battery 10 and the lead battery 41 is performed (YES at S01) at step S09 it is determined whether the present SOC exceeds the SOC upper limit for at least one of the batteries 10 and 41. The SOC upper limit is set to a value such that the excess discharge will not occur from the batteries 10 and 41. If the present SOC exceeds the SOC upper limit for at least one of the batteries 10 and 41 (YES at S09), at step S10, charging relative to the batteries 10 and 41 from the electric rotor 40 is terminated and the process ends.

It is noted that if the present SOC exceeds the SOC upper limit value, the charging relative to the batteries is terminated based on the stopping rate, which is described in detail hereinafter. Additionally, if the present SOC is equal to or lower than the SOC upper limit (S09: NO), the process is ended.

A flowchart in FIG. 3 shows a process related to the power generation control based on the stopping rate according to the present embodiment. This process is executed by the control device 20 at every predetermined cycle.

At step S21, the stopping rate, which is a percentage of the automatic stop performed in a predetermined period is calculated. Specifically, the predetermined period is a period between the present time point to the time point before the predetermined period. In this predetermined period, the percentage of time in which the vehicle stops is calculated as the stopping rate. It is noted that a period in which the vehicle is stopped, may be a period excluding parking of the vehicle that terminates the operation of the power system. At step S22, it is determined whether the engine is automatically stopped.

If the engine is automatically stopped, (YES at S22), at step S23 it is determined whether the stopping rate exceeds the first threshold Th1. If the stopping rate exceeds the first threshold Th1, (YES at S23), at step S24, the command value of the output voltage Vout of the electric rotor 40 is set to a predetermined V2 (V2>V1).

At step S25, the control of electric rotor 40 is set such that the SOC of the batteries 10 and 41 is increased with the automatic restart of the engine, and the process is ended. That is, setting is performed such that charging of the batteries 10 and 41 is initiated with the automatic restart of the engine. As the charging initiation mode to the batteries 10 and 41, at the automatic restart of the engine, configuration in which charging is started when the engine is completely combusted (when independent driving is enabled) may be provided, or a configuration in which charging is initiated when the engine rotating speed has exceeded an idle rotating speed may also be adopted. At this point, when charging of the batteries 10 and 14 is initiated with the automatic restart of the engine, the switch 15 is switched to the ON state, and charging of both batteries 10 and 41 is executed.

The amount charged to the battery 41 is set by the control device 20 (charge controller) such that the SOC of the battery 41 is increased in consideration of utilized power at the electric load 45 connected to the battery 41. That is, when the rotor of the electric rotor 40 rotates by the engine output shaft, the voltage of the direct current, generated at the electric rotor 40 is adjusted to an adjusted voltage Vreg such that the SOC of the battery 41 is a desired SOC.

In a case when the engine is not automatically stopped, (NO at S22), at step S16 it is determined whether the engine is in a driving operation. If the engine is in the driving operation (YES at S26), at step S27, it is determined whether charging of the batteries 10 and 41 is performed, when the condition of the stopping rate exceeding the first threshold Th1 is met.

If charging of the batteries 10 and 41 is performed when the stopping rate exceeds (YES at S27), at step S18, it is then determined whether the stopping rate is lower than a second threshold Th2 (Th1≥Th2). If the stopping rate is lower than the second threshold (YES at S28), at step S29, charging of the batteries 10 and 41 is terminated if the stopping rate exceeds the first threshold Th1, and the process ends.

At step S29, termination of charging of the batteries 10 and 41 is not performed if the SOC reaches a lower limit value. It is noted that, in the case of a negative determination for steps S26 to S28, the process is ended.

FIG. 4 shows a time chart of changes in the SOC of the lithium-ion battery 10 when control is performed according to this embodiment. In FIG. 4, using a solid line, changes in the SOC of the lithium-ion battery 10 is shown when charge control is performed based on the stopping rate of the embodiment. Additionally, using a broken line, changes in the SOC of the lithium-ion battery 10 is shown when the charge control is not performed based on the stopping rate of the present embodiment, and the charge control is performed based only on the SOC of the lithium-ion battery 10. Note that in an example shown in FIG. 4, the SOC of the lead battery 41 is taken as a sufficiently high SOC value.

Firstly, changes in the SOC (broken line) of the lithium-ion battery 10 when the charge control based on the SOC only is performed and the charge control which is based on the stopping rate is not performed, according to the embodiment.

At time T0, the vehicle is travelling, and charging of the lithium-ion battery from the electric rotor is terminated. For this reason, after the time T0, the SOC of the lithium-ion battery decreases with the supply of power from the lithium-ion battery 10 to the electric load 45.

At time T1, the driver performs the brake control and the regeneration of power is performed at the electric rotor 40. The SOC of the lithium-ion battery 10 increases by charging due to the generation of regenerative power. At a time point T2 when the automatic stop conditions of the engine are met (or at a time point between the times T1 to T2), the automatic stop of the engine is executed. After the time point T2, the SOC of the lithium-ion battery 10 decreases with power consumed by the electric load 45.

At time point T4, conditions for the automatic restart of the engine are met, and the engine is restarted, by operation of the accelerator by the driver, and the vehicle begins to run. It is noted that the electric power used for the automatic restart is supplied from the lead battery 41. For this reason, the SOC of the lithium battery 10 is not decreased. After the time T4, the SOC of the lithium-ion battery 10 decreases with the power supply to the electric load 45 from the lithium-ion battery 10.

At time point T5, the driver operates the brake control and regeneration of power is performed at the electric rotor 40. The SOC of the lithium-ion battery 10 increases by charging due to regeneration of power. Thereafter, at time point T6 the vehicle is stopped.

At the time point T6 when the automatic stop conditions of the engine is met (or a time point between the time point T5 and T6), the automatic stop of the engine is executed. After the time point T6, the SOC of the lithium-ion battery 10 decreases with the power consumed by the electric load 45. At time point T7, the lithium-ion battery 10 reaches the SOC lower limit, and power generation is performed at the electric rotor 40. To perform power generation at the electric rotor 40, the engine is restarted at the time point T7.

At time point T8, the automatic starting condition of the engine is met, the engine is restarted by operation of the accelerator operated by the driver, and the travelling of the vehicle begins. Thereafter, at time point T10, charging relative to the lithium-ion battery 10 from the electric rotor 40 is terminated due to the SOC of the lithium-ion battery 10 reaching the SOC upper limit.

Next, changing of the SOC of the lithium-ion battery 10 (solid line) is described, when the charge control is performed based on the stopping rate of the present embodiment.

It is noted charge control based on the stopping rate is not performed at the point T0 to T2. Furthermore, since changes in the SOC of the lithium-ion battery 10 when charge control based on only the SOC is the same (broken line) details are omitted herein.

At the time point T2, the stopping rate increases with the stopping of the vehicle. Thereafter, at the time T3 point the stopping rate exceeds the first threshold Th1. For this reason, the charge controller is set such that charging relative to the lithium-ion battery 10 is initiated with the automatic restart. At the time point T4, the automatic restart of the engine is executed. With the automatic restart of the engine, charging of the lithium-ion battery 10 from the electric rotor is performed at a charging amount that is set so that the SOC of the battery 41 is increased, in consideration the electric power used at the electric load 45. As a result, the SOC of the lithium-ion battery 10 increases when the vehicle is travelling. The time point T3 when the stopping rate exceeds the first threshold is an automatic stop period. A control to increase the SOC is performed at the automatic restart time point T4, subsequent to the automatic stop period.

Once the stopping rate exceeds the first threshold, the SOC of the batteries 10 and 41 increase, and when the engine is automatically stopped, the decrease in the SOC of the batteries 10 and 41 may be suppressed.

At the time point T6 the vehicle stops. At the time points T4 to T6, the SOC of the lithium-ion battery 10 shown with the solid line is higher than the lithium-ion battery 10 shown with the broken line, when charging of the lithium-ion battery 10 from the electric rotor 40 is performed. At the time point T6 (or between time points T5 to T6) the automatic stopping of the engine is executed. From the time point T6, the SOC of the lithium-ion battery 10 decreases with the power consumption of the electric load 45. Thereafter, at time point T8, the accelerator is operated by the driver, without the SOC of the lithium-ion battery 10 reaching the SOC lower limit.

A condition of the automatic restart of the engine is met by the operation of accelerator performed by the driver, and the vehicle starts running with the restart of the engine. At this point, since the stopping rate exceeds the first threshold Th1, charging of the lithium-ion battery 10 from the electric rotor 40 is initiated at the automatic restart of the engine. Note that between the time points T4 to T6, since the stopping rate has not fallen below the second threshold Th2 (FIG. 3, step S28 NO), validation of the charge initiation is continued with the automatic start of the engine. For this reason, at time point T8, even in a case of the stopping rate not exceeding the first threshold Th1, charging from the electric rotor 40 to the lithium-ion battery is initiated.

From time point T8, the stopping rate decreases with the running of the vehicle. At time point T9, as the stopping rate drops below the second threshold Th2, charging of the lithium-ion battery 10 from the electric rotor 40 is terminated 2.

In the present embodiment, the charge control is performed based on the stopping rate. Therefore, the restart of the engine at the time point T7 is suppressed, and the combustion of the engine is suppressed at a period of the time points T7 to T8. For this reason, the deterioration of reduced fuel consumption due to operation of the engine when the vehicle is stopped can be suppressed.
(Other Embodiments)

In the embodiment described, the higher the stopping rate, the higher the SOC lower limit is set when the vehicle is running.

However, the above configuration may be modified such that the control device 20, as the charge controller, sets a predetermined charge rate (the SOC lower limit) when the vehicle is running based on multiplication of a total power consumption and the length of the time period in which the automatic stop is continued. The total power consumption here is the total power consumption of the total electric load supplied by electrical power from the batteries 10 and 41.

The amount of the power consumption of the electric load 45 during a time period in which the vehicle is stopped is equal to multiplying the total power consumption of the total electric load 45 by the length of the time period in which the automatic stop is continued. Since the predetermined charging rate (the SOC lower limit) is set based on multiplying the total power consumption of the total electric load 45 by the length of the time period in which the automatic stop is continued, an excess discharge state of the batteries 10 and 41 is suppressed.

In the preferred embodiment described above, the percentage of time during which the vehicle is stopped in the predetermined period is calculated as the stopping rate, when the predetermined period is a time period between the present time point to a time point before the predetermined period is configured.

However this may be modified to a configuration of the control device 20, as the calculation unit, calculating the percentage of time in which the vehicle is stopped in the predetermined period, as the stopping rate. According to the configuration, if the stopping rate is calculated by the percentage of time in which the engine is automatically stopped in a predetermined period, the stopping rate which actual reflects a frequency of the idling stop control may be calculated.

In the preferred embodiment, the predetermined period is set as a period between the present time point to a time point before the predetermined period. However, this may be modified to a configuration of the controller 20, as the calculation unit, which sets a predetermined period based on a travelling distance of a vehicle in a predetermined period. That is, when travelling a predetermined distance, a ratio of a time needed to run the distance and a time in which the vehicle is stopped during this distance may be calculated as the stopping rate. Furthermore, when the vehicle travels the predetermined travelling distance, a ratio of the time needed to run the distance and a time in which the vehicle is automatically stopped during this distance may also be calculated as the stopping rate.

A configuration of the control device 20, as the calculation unit, acquiring information from a navigation system which is related to a future travelling state, and calculating a stopping rate based on this information may also be performed. In this case, a future travelling state of the vehicle is predicted and thus a future stopping rate may be calculated. Furthermore, appropriate charging may be performed according to changes in travelling state of the vehicle. For example, a stopping rate may be decreased at a time point of high speed running on a highway. In contrast, a stopping rate may be increased when there is a high possibility of vehicle congestion arising.

In the preferred embodiment, charging from the electric rotor 40 relative to the batteries 10 and 41 is performed when then SOC of either one of the lithium-ion battery 10 and the lead battery 41 is less than the SOC lower limit. At the point of charging, a configuration may be provided such that charging is performed relative to a battery that has a SOC which is lower than the SOC lower limit, from a battery which has a SOC which is equal to higher than the SOC lower limit, among the batteries 10 and 41. In this case, charging is performed by switching the switches 15 and 16 in the ON state. In the configuration described, the SOC of the batteries 10 and 41 may be rapidly increased compared to a configuration where charging is performed using only the electric rotor 40.

In the preferred embodiment, a configuration of the lithium-ion battery 10 and the lead battery 41 is provided as the electrical storage device. However this may be modified to an electrical storage device equipped with either 1 or three or more batteries. Also, batteries other than a lead battery and a lithium-ion battery may also me employed. For example, a nickel hydrogen battery may be used.

In the preferred embodiment, charging is terminated when the stopping rate falls below the second threshold Th2 however this may be omitted. In a case of omitting this configuration, charging is terminated when the SOC reaches the SOC upper limit. The charging of the batteries 10 and 41 from the electric rotor 40 is then initiated if the stopping rate exceeds the first threshold Th1, with the automatic restart. Thereafter, charging from the electric rotor 40 to the batteries 10 and 41 may be then terminated after a predetermined period has passed.

In the preferred embodiment, the time point T3 in which the stopping rate exceeds the first threshold Th1 is a duration of the automatic stop period. The control to increase the SOC is then performed at the time point T4 of the automatic restart consecutively after the automatic stop period. However, a time of performing the control to increase the SOC is not limited to the above described. That is, a second control to increase the SOC may also be performed at another time of the automatic restart. That is, the automatic restart mentioned here follows an automatic stopping period after the automatic stopping period in which the stopping rate exceeds the first threshold Th1

In contrast, a configuration may be provided in which the control to increase the SOC is not performed at the automatic restart, which follows the automatic stopping period when the stopping rate exceeds the first threshold Th1. In this case, a control to increase the SOC may be first performed at a time of the automatic restart after the automatic stop period.

The stopping rate increases when the automatic stop of the engine is performed, and thereafter the stopping rate decreases when the restart of the engine is performed. Specifically, the stopping rate is maximum at a point of the automatic restart. In this view, a configuration of determining whether the stopping rate exceeds the first threshold Th1 may be provided. According to this configuration, the number of times of determining whether the stopping rate exceeds the first threshold Th1 may be reduced, thus the process may be simplified.

Additionally, according to the determination result of the automatic stopping rate at the automatic restart, the control of the electric rotor to increase the SOC of the batteries 10 and 41 is performed at the automatic restart if the condition of the stopping rate exceeding the first threshold is met. That is, in accordance with the automatic restart, the power generation is started at the electric rotor. In the configuration, since the SOC of the batteries 10 and 41 is increased immediately after the stopping rate exceeds the first threshold Th1, a decrease in the SOC of the batteries 10 and 41 during the automatic stop of the engine may be suppressed.

In the embodiments described herein above, the electric rotor 40 having the power generation function and output function is used as the power generator. However, a device which has a power generating function, that is an alternator may be used.

SYMBOLS

10 . . . lithium-ion battery, 20 . . . control device, 30 . . . ECU, 40 . . . electric rotor, 41 . . . lead battery, 44 . . . starter

The invention claimed is:

1. A vehicle power system for mounting in a vehicle comprising:
   a power generator that generates power by rotation of an output shaft of an engine;
   an electrical storage device connected to the generator; and
   a control device that automatically stops the engine when a predetermined automatic stop condition is met, and automatically restarts the engine by driving of a starting device, when a predetermined restart condition is met, after the automatic stop of the engine,
   wherein the control device includes:
      a calculation unit which calculates a stopping rate that is a percentage of the automatic stop performed in a predetermined period; and
      a charge controller which,
         performs charging of the electrical storage device from the power generator, when a condition of a charging rate of the electrical storage device being less than a predetermined charging rate is met,
         controls the power generator at the automatic restart to increase the charging rate of the electrical storage device, when a condition of the stopping rate exceeding a first threshold is met, and
         if the condition of the stopping rate exceeding the first threshold is met, when the control of the power generator is performed to increase the charging rate of the electrical storage device, stops the charging of the electrical storage device from the power generator, when a condition of the stopping rate being lower than a second threshold is met, the stopping rate being calculated by the calculator and the second threshold being lower than the first threshold.

2. The vehicle power system according to claim 1, wherein
   at a time of the automatic restart, the control apparatus determines whether the calculated stopping rate exceeds the first threshold, with the calculation unit calculating the stopping rate; and
   the charge controller controls the power generator to increase the charging rate of the electrical storage device, when the condition of the stopping rate exceeding the first threshold is met as a determination result.

3. A vehicle power system for mounting in a vehicle comprising:
   a power generator that generates power by rotation of an output shaft of an engine;
   an electrical storage device connected to the generator; and
   a control device that automatically stops the engine when a predetermined automatic stop condition is met, and automatically restarts the engine by driving of a starting device, when a predetermined restart condition is met, after the automatic stop of the engine,
   wherein the control device includes:
      a calculation unit which calculates a stopping rate that is a percentage of the automatic stop performed in a predetermined period; and
      a charge controller which,
         performs charging of the electrical storage device from the power generator when a condition of a charging rate of the electrical storage device being less than a predetermined charging rate is met;
         controls the power generator at the automatic restart to increase the charging rate of the electrical storage device, when a condition of the stopping rate, exceeding a first threshold is met; and when the control apparatus determines whether the stopping rate exceeds the first threshold, controls the power generator to increase the charging rate of the electrical storage device with the automatic restart, if a condition of the stopping rate exceeding the first threshold is met as determination result, with the stopping rate being calculated by the calculation unit.

4. The vehicle power system according to claim 1, wherein the charge controller sets the predetermined charging rate to be higher when the vehicle is travelling, than the predetermined charging rate when the vehicle is stopped; and the higher the stopping rate, the higher the predetermined charging rate is set, when the vehicle is travelling.

5. The vehicle power system according to, claim 1, wherein the charge controller sets, the predetermined charging rate to be higher when the vehicle is travelling than the predetermined charging rate when the vehicle is stopped; and the predetermined charging rate when the vehicle is travelling based on multiplying a total amount of the consumed power of a total electric load of the power supplied from the electrical storage device by a length of time period in which the automatic stop is continuously performed.

6. The vehicle power system according to, claim 1, wherein if the condition of the stopping rate exceeding the first threshold is met, with the stopping rate being calculated by the calculation unit, when the control of the power generator is performed to increase the charging rate of the electrical storage device, the charge controller controls an output voltage of the power generator such that the output voltage is higher than when the charging of the electrical storage device from the generator is performed, when the condition of the charging rate of the electrical storage device being less than the predetermined charging rate is met.

7. A vehicle power system for mounting in a vehicle comprising:

a power generator that generates power by rotation of an output shaft of an engine;

an electrical storage device connected to the generator; and a control device that automatically stops the engine when a predetermined automatic stop condition is met, and automatically restarts the engine by driving of a starting device, when a predetermined restart condition is met, after the automatic stop of the engine, wherein the control device includes:

a calculation unit which calculates a stopping rate that is a percentage of the automatic stop performed in a predetermined period; and a charge controller which, performs charging of the electrical storage device from the power generator, when a condition of a charging rate of the electrical storage device being less than a predetermined charging rate is met; and if the condition of the stopping rate exceeding the first threshold is met, with the stopping rate being calculated by the calculation unit, when the control of the power generator is performed to increase the charging rate of the electrical storage device, controls an output voltage of the power generator such that the output voltage is higher than when the charging of the electrical storage device from the generator is performed, when a condition of the stopping rate exceeding a first threshold is met, and when the condition of the charging rate of the electrical storage device being less than the predetermined charging rate is met, the stopping rate being calculated by the calculation unit.

8. The vehicle power system according to claim 1, wherein the calculation unit calculates, as the stopping rate, a percentage of time in which the vehicle is stopped in the predetermined period.

9. The vehicle power system according to claim 1, wherein the calculation unit calculates, as the stopping rate, a percentage of time in which the automatic stop is performed in the predetermined period.

10. The vehicle power system according to claim 8, wherein the calculation unit sets the predetermined period based on a travelling distance of the vehicle.

11. The vehicle power system according to claim 1, wherein the calculation unit acquires information related to a future travelling state of the vehicle from a navigation system, and calculates the stopping rate based on the information.

12. A vehicle power system for mounting in a vehicle comprising:

a power generator that generates power by rotation of an output shaft of an engine;

an electrical storage device connected to the generator; and a control device that automatically stops the engine when a predetermined automatic stop condition is met, and automatically restarts the engine by driving of a starting device, when a predetermined restart condition is met, after the automatic stop of the engine, wherein:

the control device includes:

a calculation unit which calculates a stopping rate that is a percentage of the automatic stop performed in a predetermined period; and a charge controller which, performs charging of the electrical storage device from the power generator, when a condition of a charging rate of the electrical storage device being less than a predetermined charging rate is met, and controls the power generator at the automatic restart to increase the charging rate of the electrical storage device, when a condition of the stopping rate exceeding a first threshold is met, with the stopping rate being calculated by the calculation unit, and the calculation unit acquires information related to a future travelling state of the vehicle from a navigation system, and calculates the stopping rate based on the information.

13. The vehicle power system according to claim 1, wherein:

the electrical storage device comprises a first secondary battery and a second secondary battery, the first secondary battery and second secondary battery being connected to each other via a switching element; and the charge control performs charging of the first secondary battery and the second secondary battery by switching the switching element to an electrical conduction state, if the condition of the stopping rate exceeding the first threshold is met, with the stopping rate being calculated by the calculation unit, when the control of the power generation is performed to increase the charging rate of the electrical storage device at the automatic restart.

14. The vehicle power system according to claim 1, wherein the electrical storage device includes the first secondary battery and the second secondary battery, the first secondary battery and the second secondary battery being connected to each other via the switching elements; and the charge controller performs charging of a battery having a charging rate which is less than the predetermined charging rate, among the first secondary battery and the second secondary battery, by having the switching element provided in the electric conduction state, if a condition of the charging rate of either one of the first secondary battery and the second secondary battery being lower than the predetermined charging rate is met, when the control of the power generator is performed to increase the charging rate of the electrical storage device at the automatic re-start of the engine.

15. The vehicle power system according to claim 2, wherein the charge controller sets the predetermined charging rate to be higher when the vehicle is travelling, than the predetermined charging rate when the vehicle is stopped; and the higher the stopping rate, the higher the predetermined charging rate is set, when the vehicle is travelling.

16. The vehicle power system according to claim 2, wherein the charge controller sets, the predetermined charging rate to be higher when the vehicle is travelling than the predetermined charging rate when the vehicle is stopped; and the predetermined charging rate when the vehicle is travelling based on multiplying a total amount of the consumed power of a total electric load of the power supplied from the electrical storage device by a length of time period in which the automatic stop is continuously performed.

17. The vehicle power system according to claim 2, wherein if the condition of the stopping rate exceeding the first threshold is met, with the stopping rate being calculated by the calculation unit, when the control of the power generator is performed to increase the charging rate of the electrical storage device, the charge controller controls an output voltage of the power generator such that the output voltage is higher than when the charging of the electrical storage device from the generator is performed, when the condition of the charging rate of the electrical storage device being less than the predetermined charging rate is met.

18. The vehicle power system to claim 2, wherein the calculation unit calculates, as the stopping rate, a percentage of time in which the vehicle is stopped in the predetermined period.

19. The vehicle power system according to claim 2, wherein the calculation unit calculates, as the stopping rate, a percentage of time in which the automatic stop is performed in the predetermined period.

20. The vehicle power system according to claim 9, wherein the calculation unit sets the predetermined period based on a travelling distance of the vehicle.

* * * * *